(12) United States Patent
Wado et al.

(10) Patent No.: US 6,626,037 B1
(45) Date of Patent: Sep. 30, 2003

(54) THERMAL FLOW SENSOR HAVING IMPROVED SENSING RANGE

(75) Inventors: Hiroyuki Wado, Toyota (JP); Yukihiro Takeuchi, Nishikamo-gun (JP); Toshimasa Yamamoto, Bisai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/515,496

(22) Filed: Feb. 29, 2000

(30) Foreign Application Priority Data

Sep. 3, 1999 (JP) .......................................... 11-250793

(51) Int. Cl.$^7$ ................................................ G01F 1/68
(52) U.S. Cl. ................................ 73/204.26; 73/204.19; 73/204.11; 73/204.22
(58) Field of Search ......................... 73/204.11, 204.26, 73/204.16, 204.19

(56) References Cited

U.S. PATENT DOCUMENTS

| | | | | |
|---|---|---|---|---|
| 4,782,708 A | * | 11/1988 | Harrington et al. ...... | 73/861.05 |
| 5,295,389 A | * | 3/1994 | Nagata et al. ................. | 338/24 |
| 5,321,983 A | * | 6/1994 | Nagata ..................... | 73/204.18 |
| 5,406,841 A | * | 4/1995 | Kimura ..................... | 73/204.26 |
| 5,750,893 A | * | 5/1998 | Murata et al. ............ | 73/204.11 |
| 5,753,815 A | * | 5/1998 | Murata ..................... | 73/204.15 |
| 5,789,736 A | * | 8/1998 | Kawahara ................ | 250/208.1 |
| 5,936,156 A | * | 8/1999 | Roberts et al. ............ | 73/202.5 |
| 5,936,157 A | * | 8/1999 | Yamashita et al. ........ | 73/204.26 |
| 5,965,813 A | * | 10/1999 | Wan et al. ................ | 73/204.15 |
| 6,085,588 A | * | 7/2000 | Khadkikar et al. ....... | 73/204.23 |
| 6,106,149 A | * | 8/2000 | Smith .......................... | 374/31 |
| 6,189,367 B1 | * | 2/2001 | Smith et al. ................ | 73/19.03 |
| 6,190,035 B1 | * | 2/2001 | Smith .......................... | 374/31 |
| 6,301,960 B1 | * | 10/2001 | Yamakawa et al. ...... | 73/204.26 |
| 6,370,939 B2 | * | 4/2002 | Smith et al. ................ | 73/19.03 |
| 6,439,765 B2 | * | 8/2002 | Smith .......................... | 374/31 |

FOREIGN PATENT DOCUMENTS

| | | |
|---|---|---|
| JP | 2-193019 | 7/1990 |
| JP | 4-72523 | 3/1992 |
| JP | 4-74672 | 11/1992 |
| JP | 6-43906 | 6/1994 |
| JP | 6-68451 | 8/1994 |
| JP | 7-174600 | 7/1995 |
| JP | 2518352 | 5/1996 |
| JP | 9-243423 | 9/1997 |

* cited by examiner

*Primary Examiner*—Edward Lefkowitz
*Assistant Examiner*—Andre Allen
(74) *Attorney, Agent, or Firm*—Harness, Dickey & Pierce, PLC

(57) ABSTRACT

A flow sensor, which can detect flow velocity in a wide range including high flow velocity area with simple structure. A flow sensor includes a substrate having a hollow portion; and a thin film structure portion provided above the hollow portion. The thin film structure portion is provided with a heater formed in a center portion, an upper and a lower stream temperature detectors for detecting temperature of the fluid, a fluid thermometer for detecting temperature of the fluid, and thermal couple films provided on the substrate at a portion, where is between the heater and both temperature detectors. According to this structure, the thermal couple films enhance thermal coupling between the heater and the temperature detectors. Accordingly, it can prevent the temperature of the upper stream temperature detector from falling to around the temperature of the fluid, and it can raise a certain flow velocity at which a cooling of the low stream temperature detector due to the flowing fluid exceeds a heating by the heater. Therefore, it can detect flow velocity in a wide range including high flow velocity area.

18 Claims, 12 Drawing Sheets

FIG. 2
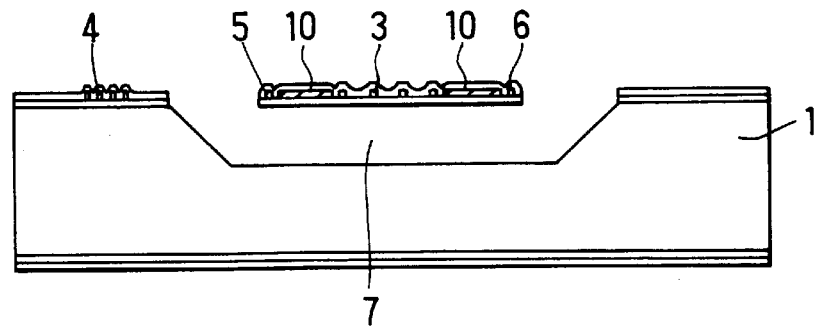
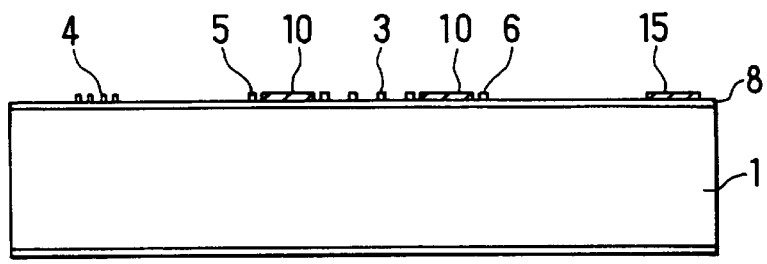
FIG. 3A
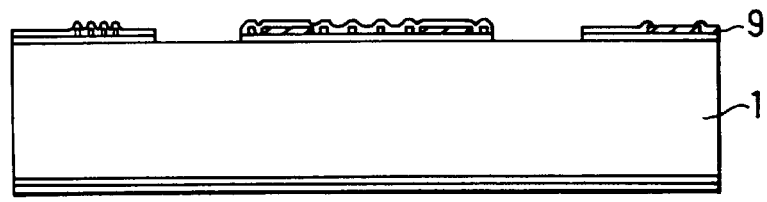
FIG. 3B
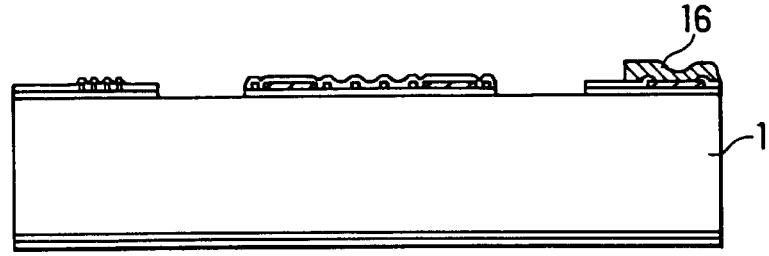
FIG. 3C
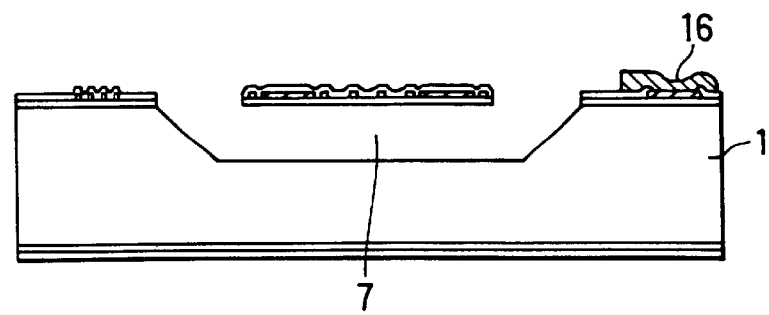
FIG. 3D

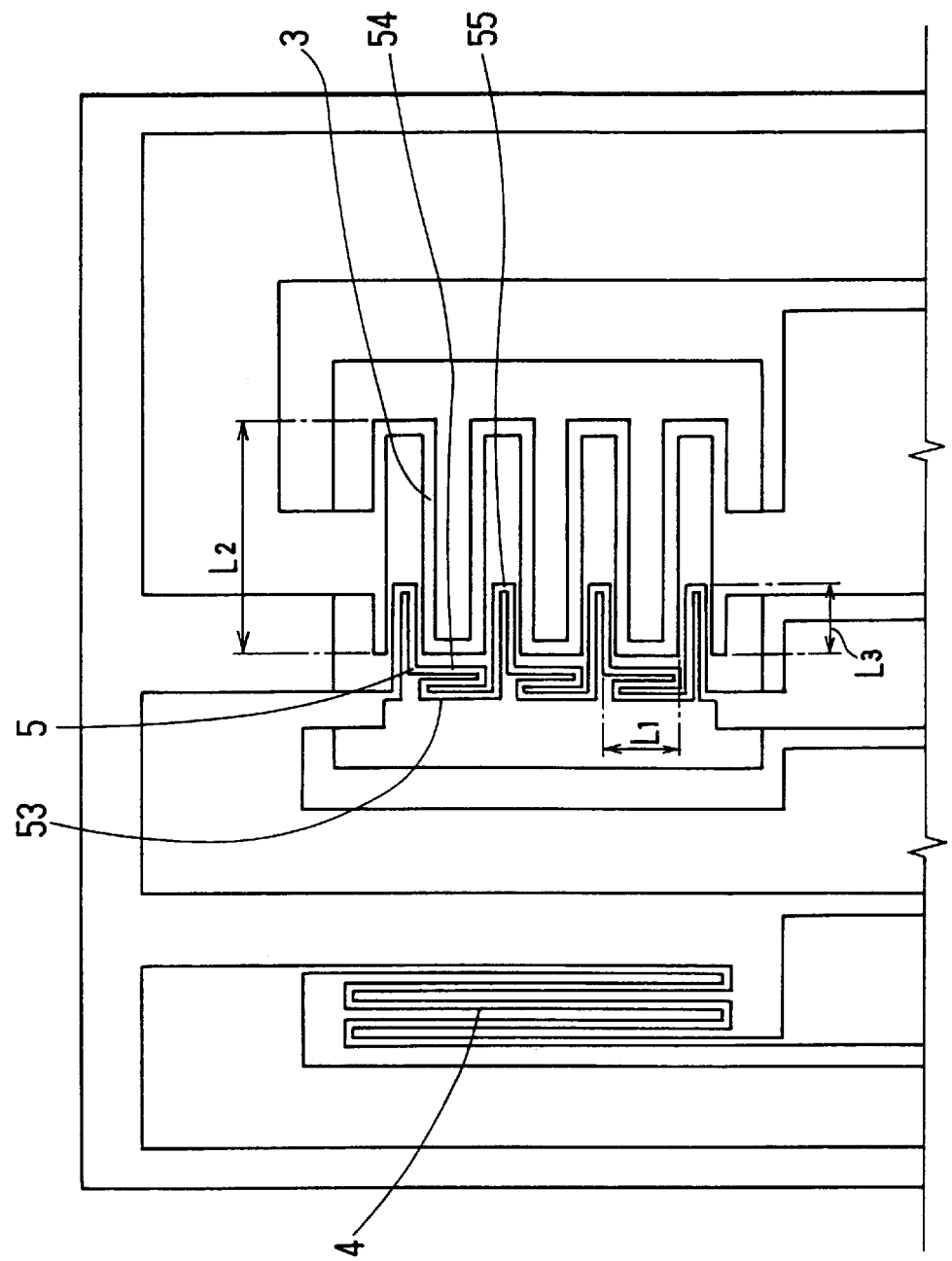

THERMAL FLOW SENSOR HAVING IMPROVED SENSING RANGE

CROSS REFERENCE TO RELATED APPLICATION

This application is based upon Japanese Patent Application Nos. Hei. 10-251399 filed on Sep. 4, 1998, and Hei. 11-250793 filed on Sep. 3, 1999, the contents of which are incorporated herein by reference.

BACKGROUND OF THE INVENTION

1. Field of the Invention

This invention relates to flow sensors, and particular to a flow sensor for detecting flow velocity of fluid, and a manufacturing the same.

2. Related Art

Conventionally, flow sensors for detecting flow velocity of fluid flowed along a heater and a temperature detector have been proposed. This kind of flow sensor is generally provided with the heater and the temperature detector, each of which is made of film structure, on a semiconductor substrate (JP-B-6-43906, JP-A-7-174600, or JP-A-9-243423).

FIG. 11 shows a perspective view of a flow sensor according to a related art. A hollow portion 7 is provided in a substrate 1; and a thin film structure portion 2 is provided above the hollow portion 7 so that the thin film structure portion 2 is bridged over the hollow portion 7. In the thin film structure portion 2, a heater 3 is formed in a center portion, and an upper stream temperature detector 5 and a lower stream temperature detector 6 are formed at both peripheral sides. A fluid thermometer 4 for detecting temperature of the fluid is formed on the substrate 1 at a portion, where is different portion of the thin film structure portion 2 and where is an upper stream side of the fluid, which is shown by arrow in FIG. 11.

In this kind of sensor, the heater is operated so that the heater has a certain temperature higher than a fluid temperature, which is detected by the fluid thermometer 4, by a predetermined temperature. The temperature of the upper stream temperature detector 5 falls as the result of losing heat due to flowing of the fluid flows along the upper stream temperature detector 5; whereas the temperature of the lower stream temperature detector 6 rises due to heat generated by the heater 3. The flow velocity of the fluid is measured (detected) based on a temperature difference between the upper stream temperature detector 5 and the lower stream temperature detector 6.

According to the flow sensor having the above-described structure, each of the temperatures of the upper stream temperature detector 5 and the lower stream temperature detector 6 changes with respect to the flow velocity as shown in FIG. 12A; and the temperature difference between the upper stream temperature detector 5 and the lower stream temperature detector 6 changes with respect to the flow velocity as shown in FIG. 12B. As can be understood from FIG. 12B, a characteristic has good linearity at low flow velocity area; however, the linearity becomes worse at high flow velocity area. The reason is as follows. Since the thin film structure portion 2 has an extremely small thermal capacity, the upper stream temperature detector 5 is cooled to around the temperature of the fluid as the flow velocity increases so that a changing ratio of the temperature with respect to the flow velocity is lowered, and a cooling of the lower stream temperature detector by the fluid exceeds a heating by the heater 3. As a result, the temperature difference decreases as the flow velocity increases.

In order to prevent a decreasing of sensibility at the high flow velocity area, some countermeasures are proposed in JP-B-6-68451 or JP-B-4-74672. According to a countermeasure in JP-B-6-68451, the thin film structure portion is made of a metallic film having extremely high thermal capacity to enable to detect at the high flow velocity area. On the contrary, according to a countermeasure in JP-B-4-74672, the temperature detection portion is laminated on the heater with an insulating film interposed therebetween to enable to detect at the high flow velocity area.

However, according to these countermeasures, a structure may be complicated, because they apply the laminated structure of the heater, the temperature detector and the metallic film having extremely high thermal capacity, or apply the laminated structure of the heater and the temperature detector. Furthermore, a method of manufacturing this kind of structure body may be also complicated. Furthermore, in the case where such the laminated structure is applied, particularly where the heater and the temperature detector are made of metallic films and two layers metallic films are formed in the structure body, it is difficult to control a warpage of the structure body due to a stress distribution. Furthermore, thermal stress is generated in the structure body, because the warpage changes due to difference of a thermal expansion coefficient between each material as temperature of the structure body changes. Therefore, when a cooling/heating cycle is repeatedly applied to the structure body as a result of turning on/off of a power supply, or of intermittently turning on, the reliability of the structure body may decrease.

SUMMARY OF THE INVENTION

This invention has been conceived in view of the background thus far described and its object is to enable to detect flow velocity in a wide range including high flow velocity area with simple structure.

According to the present invention, a thermal couple film is formed on the substrate at a portion, where is between the heater and the temperature detector, to enhance thermal coupling therebetween. Accordingly, it can prevent the temperature of the temperature detector from falling to around the temperature of the fluid, and therefore, it can detect flow velocity in a wide range including high flow velocity area.

According to another aspect of the invention, a temperature detector has a predetermined pattern so that at least one-portion of the temperature detector is enclosed in an inside of the pattern of the heater. Accordingly, it can prevent the temperature of the temperature detector from falling to around the temperature of the fluid, and therefore, it can detect flow velocity in a wide range including high flow velocity area.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 2 is a sectional view of the flow sensor taken along a line II—II in FIG. 1;

FIGS. 3A–3D are sectional views illustrating each step of method of manufacturing the flow sensor shown in FIGS. 1 and 2;

FIG. 10B is an enlarged plan view of FIG. 10A;

DESCRIPTION OF THE PREFERRED EMBODIMENTS

First Embodiment

Figure 1:
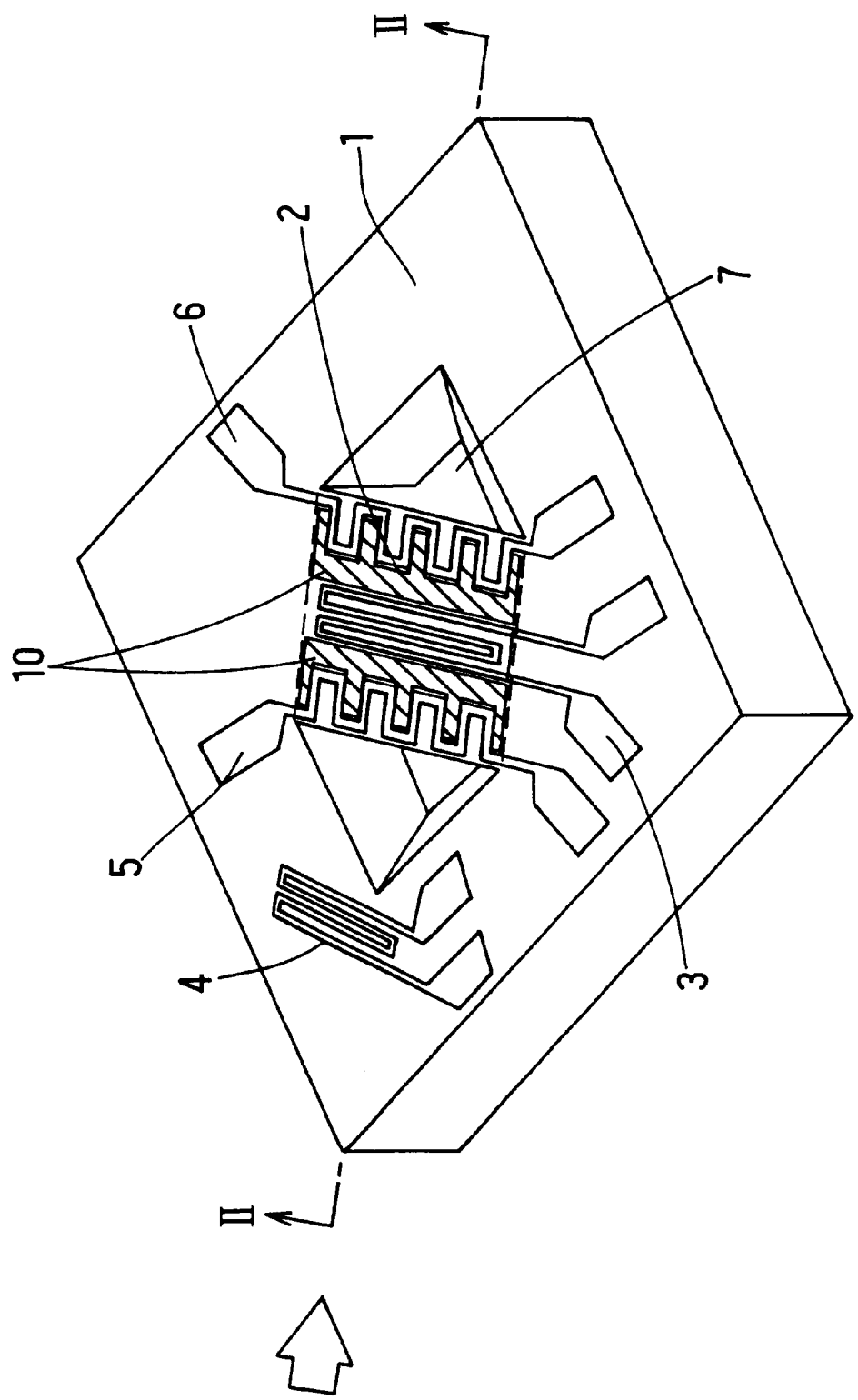
FIG. 1 is a perspective view of a flow sensor of a first embodiment according to the present invention.

FIG. 1 is a perspective view of a thermal sensitive flow sensor of a first embodiment according to the present invention; and FIG. 2 is a sectional view of the flow sensor taken along a line II—II in FIG. 1.

A hollow portion 7 is provided in a substrate 1; and a thin film structure portion 2 is provided above the hollow portion 7 so that the thin film structure portion 2 is bridged over the hollow portion 7. In the thin film structure portion 2, a heater 3 is formed in a center portion, and an upper stream temperature detector 5 and a lower stream temperature detector 6 are formed at both peripheral sides. A fluid thermometer 4 for detecting temperature of the fluid is formed on the substrate 1 at a portion at upper stream side of the fluid, where is different portion than the thin film structure portion 2, which is shown by arrow in FIG. 1.

Furthermore, as shown in FIGS. 1 and 2, thermal couple films 10 are provided on the substrate at portions, where are both between the heater 3 and the upper stream temperature detector (first detector) 5, and between the heater 3 and the lower stream temperature detector (second detector) 6. The thermal couple film 10 is made of a platinum (Pt) film, which is the same as material of the heater 3, temperature detectors 5 and 6. The thermal couple film 10 has a shape along the heater 3 and the temperature detectors 5 and 6.

In this embodiment, each of the temperature detectors 5 and 6 is formed so as to alternately wind. The thermal couple film 10 has a comb-shape to fill up among each adjacent winding portion of the temperature detectors 5 and 6.

In this kind of sensor, the heater is operated so that the heater has a certain temperature higher than a fluid temperature, which is detected by the fluid thermometer 4, by a predetermined temperature. The temperature of the upper stream temperature detector 5 falls as the result of losing heat due to the fluid flows along the upper stream temperature detector 5; and the temperature of the lower stream temperature detector 6 rises due to heat generated by the heater 3. The flow velocity of the fluid is measured (detected) based on a temperature difference between the upper stream temperature detector 5 and the lower stream temperature detector 6.

According to this embodiment, since the thermal couple films 10 are provided, thermal coupling between the heater 3 and the upper stream temperature detector 5 is intensified (becomes strong), and the thermal couple between the heater 3 and the lower stream temperature detector 6 is also intensified. Accordingly, it can prevent the temperature of the upper stream temperature detector 5 from falling to around the temperature of the fluid. Furthermore, it can raise a certain flow velocity at which a cooling of the low stream temperature detector 6 due to the flowing fluid exceeds a heating by the heater 3. Therefore, it can detect flow velocity in a wide range including high flow velocity area.

Next, a method of manufacturing the flow sensor described the above will be explained hereinafter with reference to FIGS. 3A—3D.

[Step Shown in FIG. 3A]

A semiconductor substrate (silicon substrate) 1 is prepared. A lower film 8 is formed on the semiconductor substrate 1. This lower film 8 is made up of two layers insulating films in which a $Si_3N_4$ film and a $SiO_2$ film are laminated each other, so that an internal stress undergone in the lower film 8 is released. After that, platinum film having a thickness of 2000 Å is deposited on the lower film 8 at 200° C. as a film constituting the heater 3, the fluid thermometer 4, the thermal couple film 10, and the temperature detectors 5 and 6. Here, titanium (Ti) film having a thickness of 50 Å as a bonding layer is deposited between the Pt film and the lower film 8. After that, the heater 3, the fluid thermometer 4, the thermal couple film 10, the temperature detectors 5 and 6, and an electrode-taking portion 15 are patterned to predetermined shapes by etching.

[Step Shown in FIG. 3B]

An upper film 9 made up of two layers films, in which a $Si_3N_4$ film and a $SiO_2$ film are laminated, is formed on the lower film 8 and the Pt film, alike the forming of the lower film 8. After that, openings are formed by etching predetermined portions, where the hollow portion 7, the heater 3, the fluid thermometer 4, the temperature detectors 5 and 6, and the electrode-taking portion 15 are to be formed.

[Step Shown in FIG. 3C]

After depositing gold (Au) film having a thickness of 5000 Å on the entire surface of the silicon substrate 1, an etching is performed to the Au film so as to form an etching protection film 16, which covers the electrode-taking portion 15. The etching protection film 16 is used for protecting the electrode-taking portion 15 from silicon etchant to be used in the next step, and for enhancing an adhesion with Au layer, when the Au layer is used as an external wire.

[Step Shown in FIG. 3D]

The hollow portion 7 is formed by using an anisotropic etching using TMAH solution from a main surface side of the silicon substrate 1. In these ways, the flow sensor shown in FIGS. 1 and 2 is formed.

According to this flow sensor, since the thermal couple films 10 are formed at both between the heater 3 and the upper stream temperature detector 5, and between the heater 3 and the lower stream temperature detector 6, it can enhance the thermal coupling between the heater 3 and both of the temperature detectors 5 and 6. In this case, the heater 3, the temperature detectors 5 and 6, and the thermal couple film 10 are made of a common material, and are manufactured in a common step at the same time. Therefore, this flow sensor can be manufactured without increasing a special step. Furthermore, since only one metallic film is used in the structure body of the thin film structure portion 2, a stress control can be simplified. Concretely, the structure body becomes strong against thermal stress, because warpage due to temperature changing is sufficiently prevented by arranging the platinum film, which constitutes the heater 3 and the temperature detectors 5 and 6, at substantially center portion of the film structure, and by symmetry arranging the lower film 8 and the upper film 9 with respect to (on and under) the platinum film.

Here, polysilicon, NiCr, TaN, SiC, W or the like may be used as the film constituting the heater 3, the fluid thermometer 4, the thermal couple film 10, and the temperature detectors 5 and 6, instead of platinum. Furthermore, a single film made of $TiO_2$, $Al_2O_3$, $Ta_2O_5$, $MgO$ and so on, or a multilayer film including one of them may be used as the lower film 8 and the upper film 9, as long as it can protect the heater 3 and so on. Furthermore, the etching protection film 16 may be elected another material other than gold, as long as the film has durability for the etchant and has an adhesion between the connecting wire. Here, the etching protection film 16 may be omitted when the exposed electrode-taking portion 15 has durability for the etchant. The hollow portion 7 may be formed by another etching other than the anisotropic etching using the TMAH solution, as long as the hollow portion 7 is formed.

Figure 4:
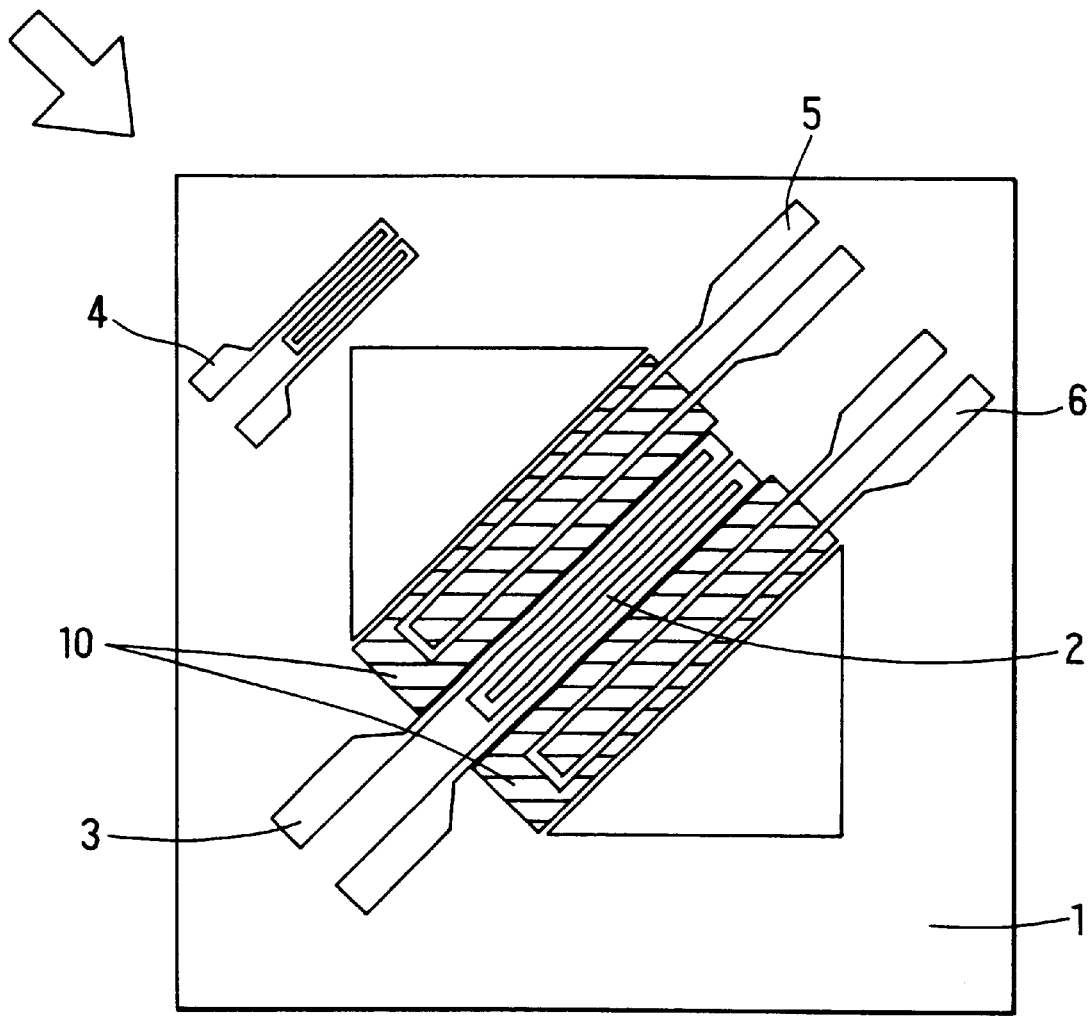
FIG. 4 is a plan view of a modified flow sensor according to the present invention.

In this embodiment, the thermal couple films 10 are provided both between the heater 3 and the upper stream temperature detector 5, and between the heater 3 and the lower stream temperature detector 6. However, as shown in FIG. 4, the thermal couple films 10 may be provided both sides of the heater 3 at the thin film structure portion 2, and the temperature detectors 5 and 6 may be arranged inner side of the thermal couple films 10. In other words, the thermal couple film 10 may be formed to another area other than where the temperature detectors 5 and 6 are to be formed. According to this modification, the thermal coupling between the heater 3 and both the temperature detectors 5 and 6 can be further intensified.

Second Embodiment

Figure 5:
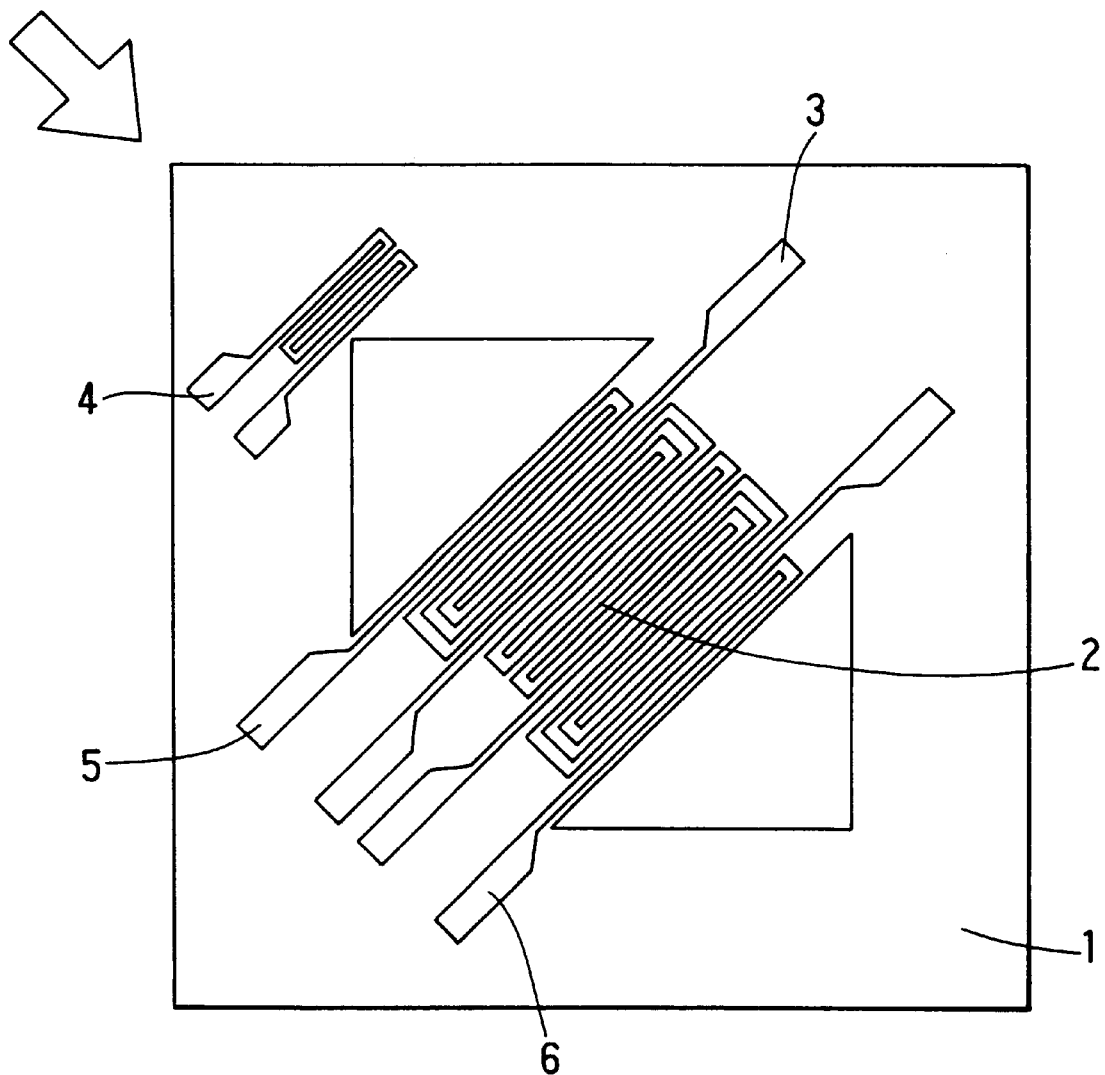
FIG. 5 is a plan view of a flow sensor of a second embodiment according to the present invention.

FIG. 5 is a plan view of a flow sensor of a second embodiment according to the present invention. In this embodiment, the heater 3 and the temperature detectors 5 and 6 are arranged so that parts of the temperature detectors 5 and 6 are arranged between adjacent portions of the heater 3. That is, each of the heater 4, the temperature detectors 5 and 6 is formed so as to alternately wind. In other words, the heater 3 has two U-shape portions, and each of the temperature detectors 5 and 6 has a U-shape portion each of which meshes (or confronts) with the one of two U-shape portion of the heater 3.

Accordingly, it can prevent the temperatures of the temperature detectors 5 and 6 from falling to around the temperature of the fluid, even if the fluid flows at high velocity. Here, when the entire portion of the temperature detectors 5 and 6 are included in the pattern of the heater 3, it can detect flow velocity in a wide range including high flow velocity area with much high sensibility.

According to the above-described embodiments, the operation has explained by using the case where the fluid is flowed from the upper stream temperature detector 5 side to the lower stream temperature detector 6 side, and where the flow velocity is measured based on the temperature difference between the upper stream temperature detector 5 and the lower stream temperature detector 6 when the heater 3 is controlled to the certain temperature higher than the fluid temperature detected by the fluid thermometer 4 by the predetermined temperature. However, a temperature difference occurs between the upper stream temperature detector 5 and the lower stream temperature detector 6 (in this case, the temperature detected by the upper stream temperature. detector 5 is higher than that by the lower stream temperature detector 6), even when fluid is backwardly flowed from the lower stream temperature detector 6 side to the upper stream temperature detector 5 side. Therefore, according to this flow sensor, the flow velocity and a direction of the fluid can be detected based on the temperatures detected by both the upper stream temperature detector 5 and the lower stream temperature detector 6.

Furthermore, the temperature detectors 5 and 6 are provided at both sides of the heater 3 in the above embodiments, however, the temperature detector may be provided only one side of the heater 3 to detect the flow velocity. A thin film structure formed in a diaphragm may be applied instead of the film structure formed in the bridge provided above the hollow portion 7. These modifications will be explained in the following embodiment.

Third Embodiment

Figure 6:
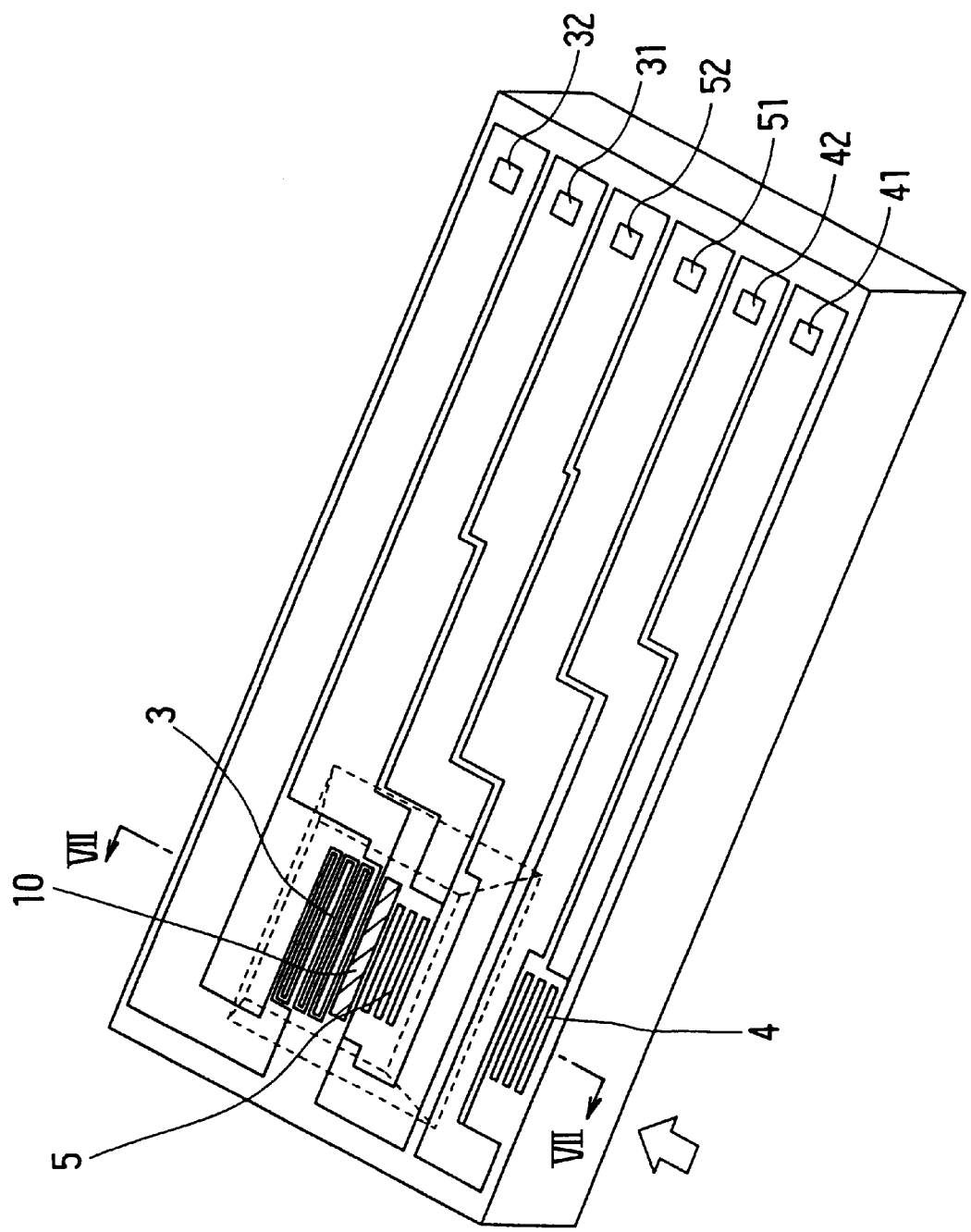
FIG. 6 is a perspective view of a thermal sensitive flow sensor of a third embodiment according to the present invention.
Figure 7A:
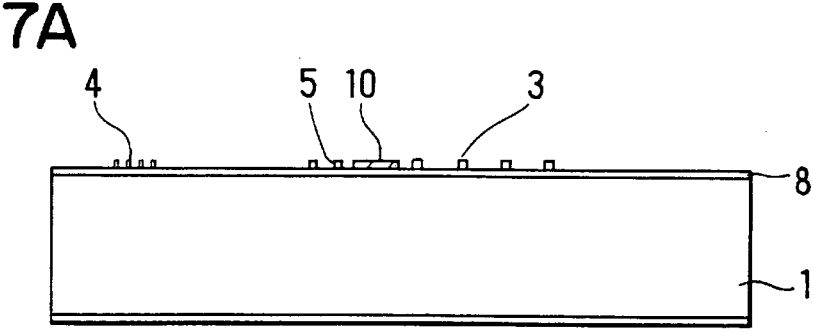
FIGS. 7A–7C are sectional views illustrating each step of method of manufacturing the flow sensor shown in FIG. 6.
Figure 7B:
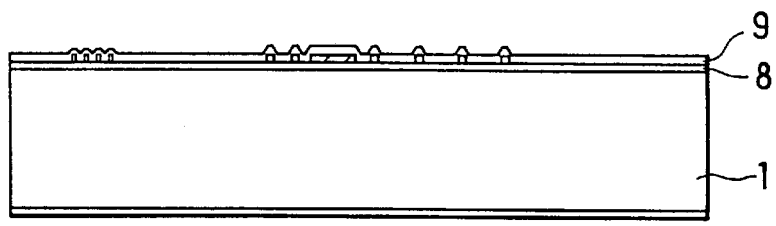
Figure 7C:
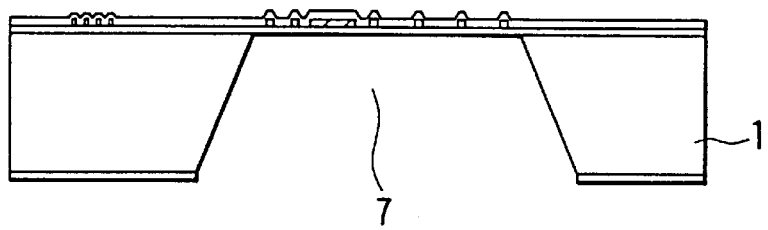

FIG. 6 is a perspective view of a thermal sensitive flow sensor of a third embodiment; and FIG. 7C is a sectional view of the flow sensor taken along a line VII—VII in FIG. 6. In this embodiment, as briefly described the above, the temperature detector (upper stream temperature detector 5) is provided only one side of the heater 3 of the first embodiment, and furthermore the thin film structure portion 2 is constructed by a thin film structure formed in a diaphragm, by providing the hollow portion 7 at a back surface side of the silicon substrate 1.

Figure 8:
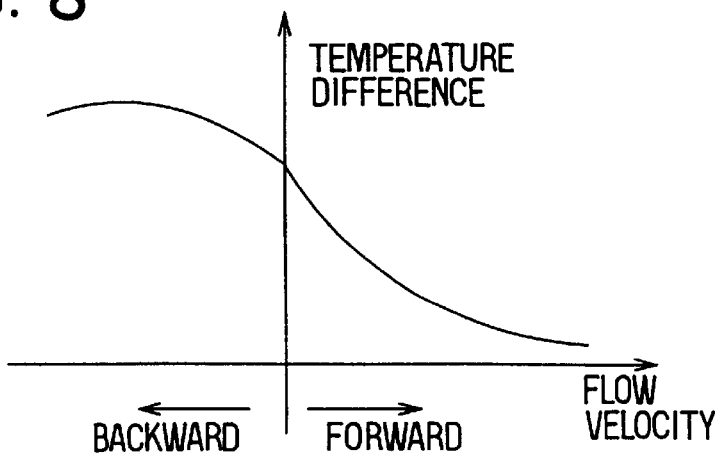
FIG. 8 is a graph illustrating a relationship between flow velocity and temperature difference between a fluid thermometer 4 and an upper stream temperature detector 5.

In this embodiment, in the case where the heater 3 is controlled so that the heater 3 has a certain temperature higher than the fluid temperature detected by the fluid thermometer 4 by a predetermined temperature, as shown in FIG. 8, a temperature difference between the fluid thermometer 4 and the upper stream temperature detector 5 in a forward direction (direction indicated by an arrow in FIG. 6) is small because heat is radiated from the upper stream temperature detector 5, while a temperature difference between the fluid thermometer 4 and the upper stream temperature detector 5 in a backward direction (opposite direction of the arrow in FIG. 6) is large because heat is transferred to the upper stream temperature detector 5. Therefore, in this embodiment, the flow velocity and the direction of the fluid are detected based on the temperature difference between the fluid thermometer 4 and the upper stream temperature detector 5.

The thermal sensitive flow sensor of this embodiment can also detect the flow velocity and the direction of the fluid, because the thermal couple film 10 is provided between the upper stream temperature detector 5 and the heater 3.

FIGS. 7A–7C are sectional views illustrating each step of method of manufacturing the flow sensor. Each step is basically the same as that of the first embodiment except of the following points, that is: the upper stream temperature detector 5 is formed only one side of the heater 3; and the hollow portion 7 is formed to the back surface of the silicon substrate 1 by performing an etching from the back surface of the silicon substrate 1. Concretely, as shown in FIG. 7A, the lower film 8 is formed on the silicon substrate 1; platinum film is deposited on the lower film 8; and the lower film 8 is patterned to form the heater 3, fluid thermometer 4, temperature detector 5, and thermal couple film 10. As shown in FIG. 7B, the upper film 9 is formed on the silicon substrate 1. As shown in FIG. 7C, after forming one of SiN film and $SiO_2$ film on the back surface of the silicon substrate 1; the film is partly opened; and the performing an anisotropic etching from the back surface of the silicon substrate 1 through an opening of the film so that the hollow portion 7 is formed.

According to this flow sensor, alike the above-described embodiments, since the heater 3, the temperature detector 5, and the thermal couple film 10 are made of a common material, and are manufactured in a common step at the same time, this flow sensor can be manufactured without increasing a special step. Furthermore, since only one metallic film is used in the structure body of the thin film structure portion 2, a stress control can be simplified. Concretely, the structure body becomes strong against thermal stress, because warpage due to temperature changing is sufficiently prevented by arranging the platinum film, which constitutes the heater 3 and the temperature detector 5, at substantially center portion, of the film structure, and by symmetry arranging the lower film 8 and the upper film 9 with respect to (on and under) the platinum film.

Fourth Embodiment

Figure 9A:
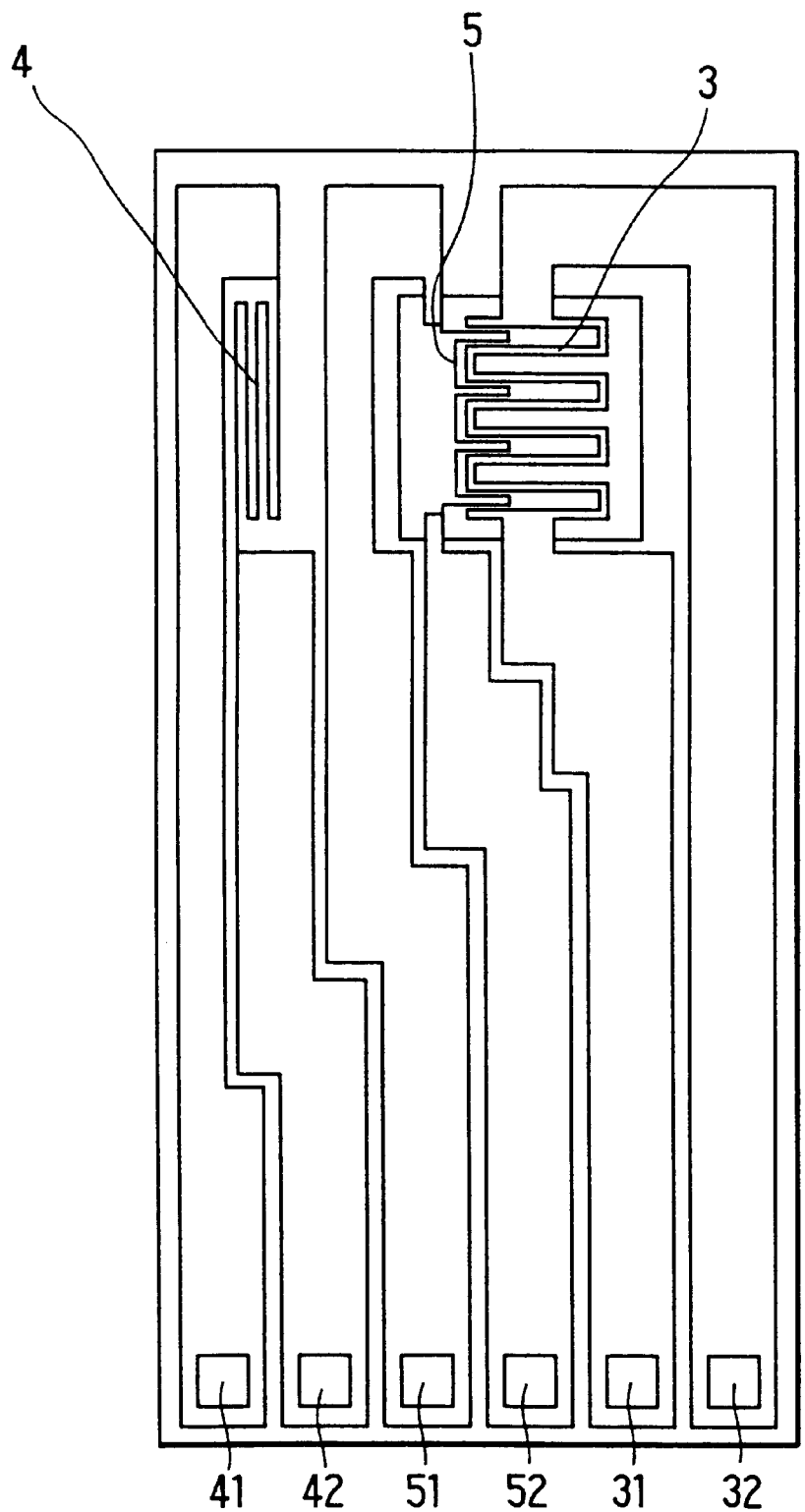
FIG. 9A is a plan view of a thermal sensitive flow sensor of a fourth embodiment according to the present invention.
Figure 9B:
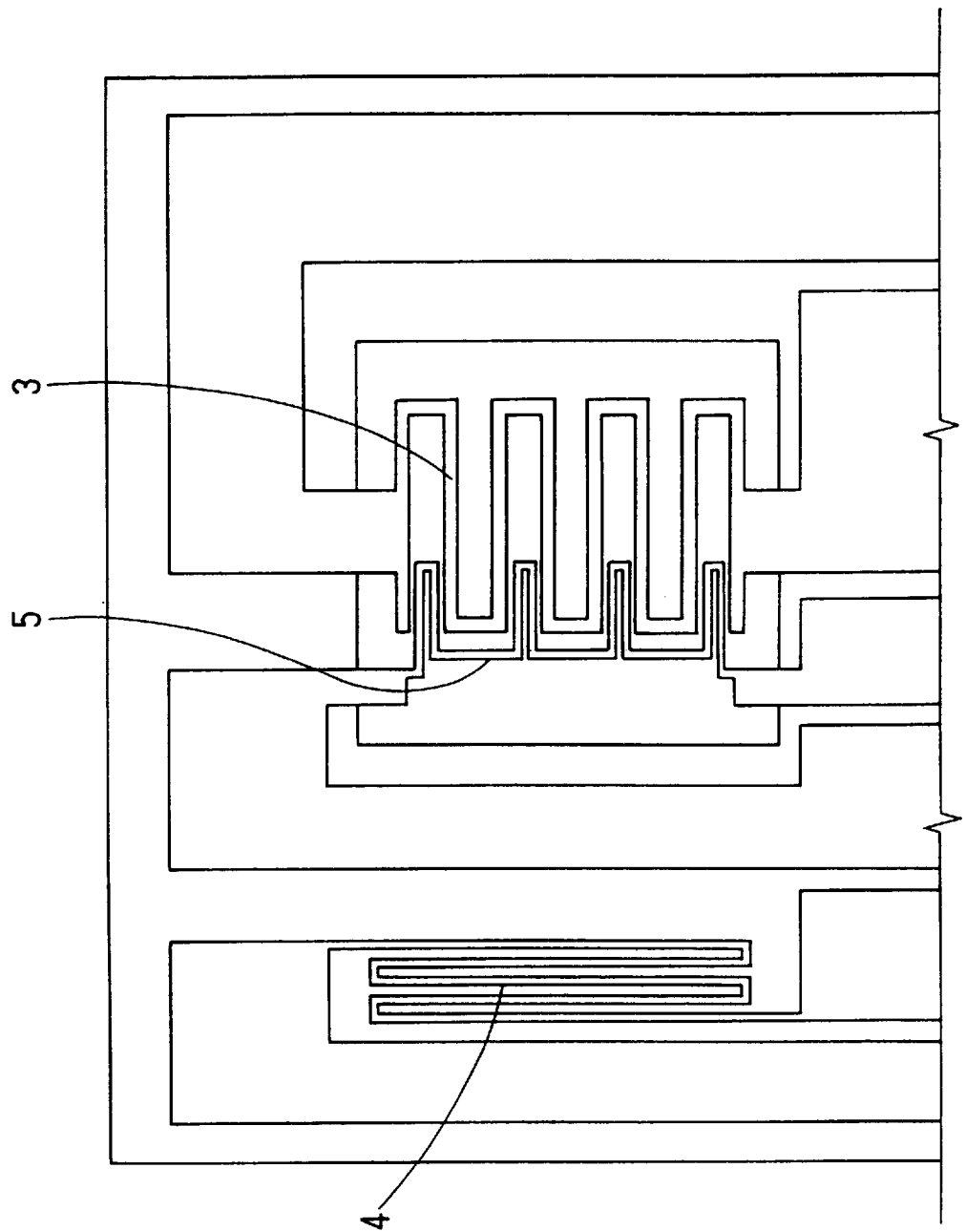
FIG. 9B is an enlarged plan view of FIG. 9A.

FIG. 9A is a plan view of a thermal sensitive flow sensor of a fourth embodiment; and FIG. 9B is an enlarged plan view of FIG. 9A. In this embodiment, the temperature detector (upper stream temperature detector 5) is provided to one side of the heater 3 of the second embodiment, and the thin film structure portion 2 is formed on a diaphragm, which is formed in the silicon substrate 1 by providing the hollow portion 7 at the back surface side of the silicon substrate 1.

In this embodiment, as shown in FIGS. 9A and 9B, each of the heater 3 and the temperature detector 5 is formed so as to alternately wind. In other words, the heater 3 has plural (i.e., four) returning portions 3a, 3b, 3c and 3d, and the temperature detector 5 also has plural (i.e., four) returning portions 5a, 5b, 5c and 5d. Each of the returning portions 5a, 5b, 5c and 5d of the temperature detector 5 is partly enclosed in the inside of each of the adjacent returning portions 3a, 3b, 3c and 3d of the heater 3 pattern.

In this embodiment, the temperature detector is constituted by only the upper stream temperature detector 5, however, the heater 3 and the temperature detector 5 are arranged so that at least one part (or the entire portion) of the temperature detector 5 is enclosed in the pattern of the heater 3. Therefore, this flow sensor can detect flow velocity and the direction of the fluid in a wide range including high flow velocity area with simple structure, even if there is no thermal couple film 10. Furthermore, since there is no thermal couple film 10, the structure can be downsized, thermal capacity is lowered, and responsibility is improved.

Fifth Embodiment

Figure 10A:
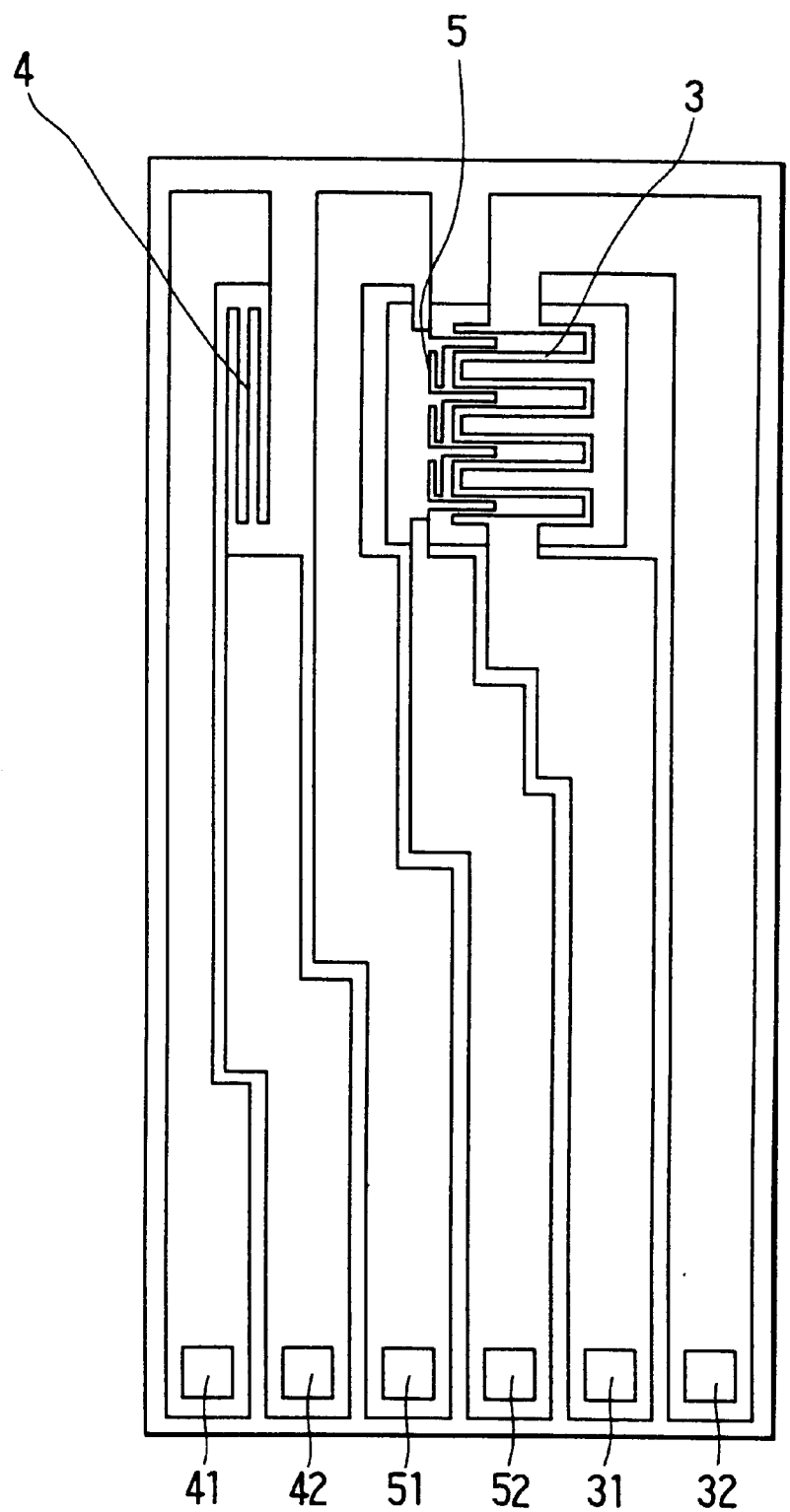
FIG. 10A is a plan view of a thermal sensitive flow sensor of a fifth embodiment according to the present invention.
Figure 11:
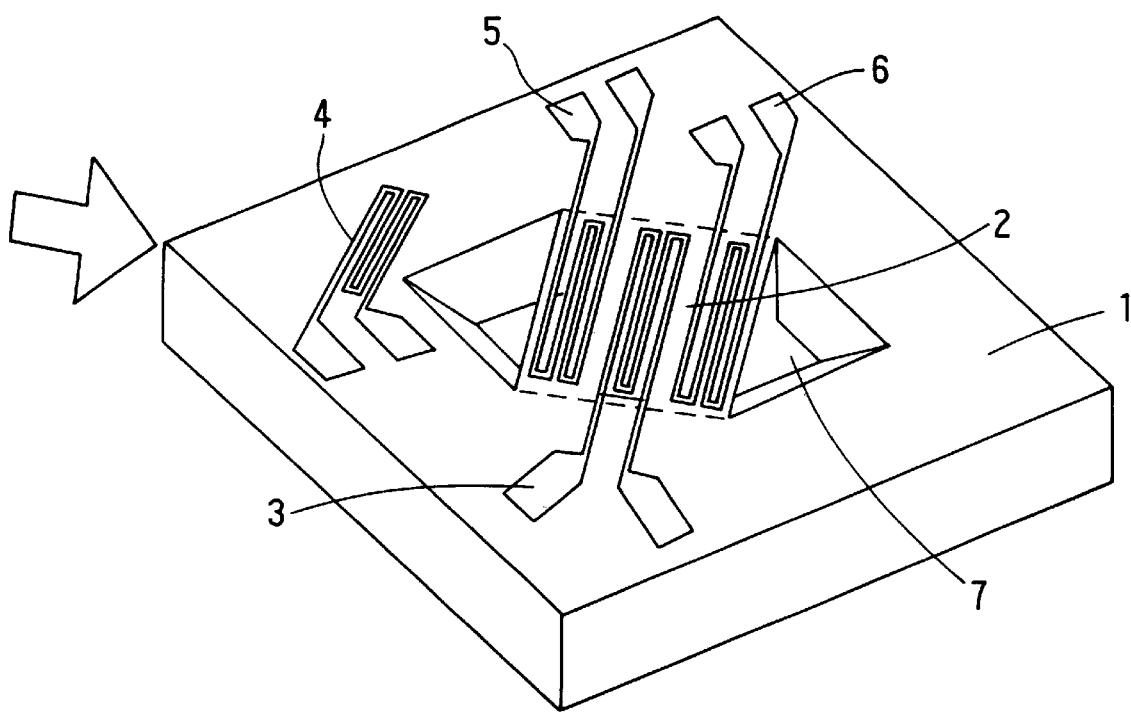
FIG. 11 is a perspective view of a thermal sensitive flow sensor according to the related art.
Figure 12A:
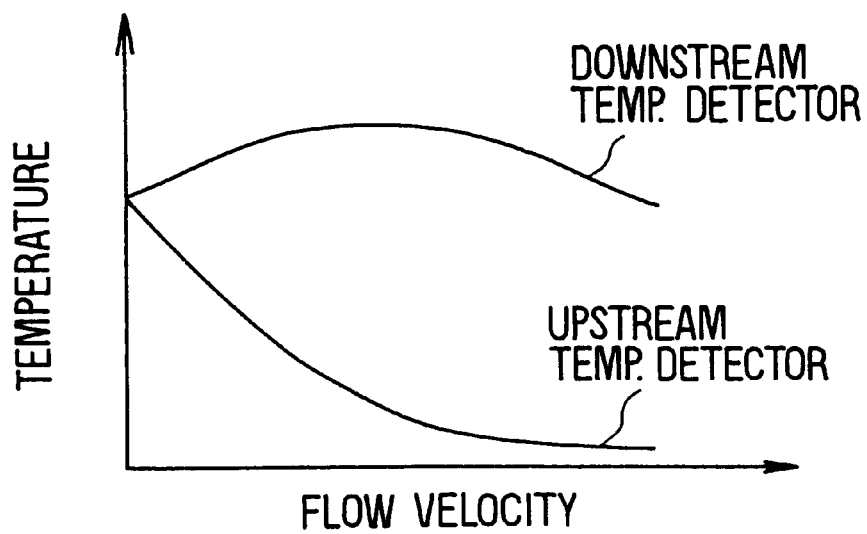
FIG. 12A is a graph illustrating relationships between flow velocity and temperature of an upstream temperature detector, and between flow velocity and temperature of a downstream temperature detector.
Figure 12B:
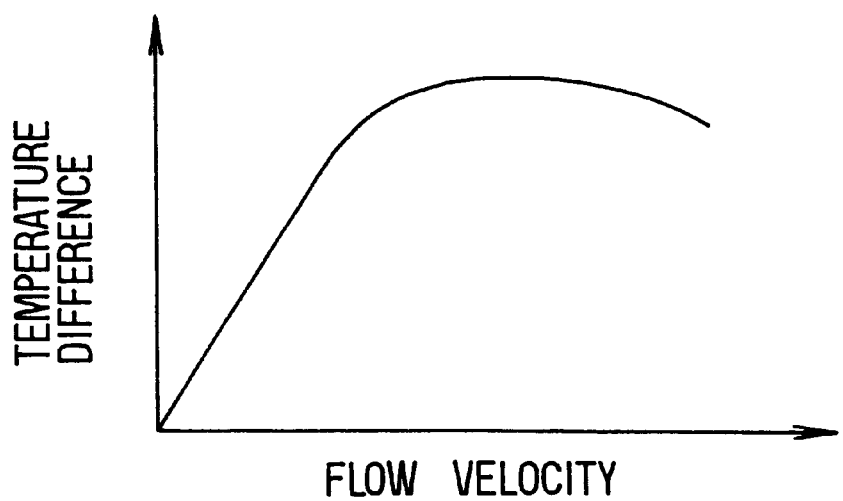
FIG. 12B is a graph illustrating relationships between flow velocity and temperature deference between the upstream temperature detector and the downstream temperature detector.

FIG. 10A is a plan view of a thermal sensitive flow sensor of a fifth embodiment; and FIG. 10B is an enlarged plan view of FIG. 10A. The flow sensor of this embodiment is basically the same as that of the fourth embodiment except of the pattern of the upper stream temperature detector 5.

In this embodiment, as shown in FIG. 10B, the upper stream temperature detector 5 is prolonged by adding plural extension portions 53 on the way in series, in order to increase total resistance of the upper stream temperature detector 5 on the diaphragm. Each of the extension portions 53 has plural returning portions 53a and 53b (in this figure, the number of the returning portions 53a and 53b of each extension portion 53 is two).

In this kind of flow sensor using the thin film type temperature detector, detection accuracy can be improved by increasing the resistance of the temperature detector, because changing rate of the resistance with respect to changes of the temperature increases as the total resistance of the temperature detector increases. According to the flow sensor of this embodiment, since extension portions 53 are added in series to the upper stream temperature detector 5, detection accuracy can be further improved compared to that of the fourth embodiment.

Here, in the upper stream temperature detector 5, when a length of a connecting portion 54, which connects the enclosed portions 5a and 5b: (which is enclosed in the pattern of the heater 3), is taken as $L_1$, it is preferable to set a total length $L_T$ of each extension portion 53 to $L_1 < L_T < 6L_1$ (in this embodiment, $L_T$ is around $2L_1$). When each returning portion 53 has a length of around $2L_1$ like this embodiment, the number of the returning portions 52a and 53b of each extension portion 53 is preferably set to two, four, or six to effectively increase the length and to prevent the thermal coupling effect from decreasing due to distancing from the heater 3.

In the fourth and the fifth embodiments, the length $L_3$ of the enclosed portion to be enclosed in the pattern of the heater 3 is less than half of a length $L_2$ Of each returning portion of the heater 3 ($L_3 < L_2/2$). According to this structure, it can prevent the detection sensibility from decreasing at low flow velocity area, and can detect flow velocity in a wide range including high flow velocity area with simple structure.

What is claimed is:

1. A flow sensor for detecting a flow velocity of fluid, comprising:
   a substrate;
   a heater for generating heat, being formed on the substrate, and having a film structure;
   a temperature detector for detecting temperature of the fluid, being formed on the substrate, and having a film structure; and
   a thermal conductive film formed on the substrate at a position between the heater and the temperature detector, for enhancing thermal conductivity therebetween wherein
   the thermal conductive film is separated from an electrical heating function of the heater and an electrical detection function of the temperature detector.

2. A flow sensor according to claim 1, wherein:
   the substrate has a hollow portion and a thin film structure portion provided above the hollow portion;
   the heater and the temperature detector are formed on the film structure portion;
   the temperature detector includes a first detector and a second detector;
   the thermal conductive film includes a first film provided between the heater and the first detector, and a second film provided between the heater and the second detector; and the flow velocity of the fluid is detected based on temperature difference between the temperature detected by the first detector and the temperature detected by the second detector.

3. A flow sensor according to claim 1, wherein:

the substrate has a hollow portion and a thin film structure portion provided above the hollow portion; and further comprising:
   a fluid thermometer formed on the substrate at a portion other than the thin film structure portion, for detecting temperature of the fluid, wherein:
     the flow velocity of the fluid is detected based on a temperature difference between the temperature detected by the temperature detector and the temperature detected by the fluid thermometer.

4. A flow sensor according to claim 1, wherein:

the substrate has a hollow portion and a thin film structure portion provided above the hollow portion;

the film structure portion is constructed by symmetrically arranging a pair of insulators on and under the heater, the temperature detector and the thermal conductive film.

5. A flow sensor according to claim 1, wherein the insulators are made up of a combination of silicon nitride film and silicon oxide film.

6. A flow sensor according to claim 1, wherein each of the heater, the temperature detector, and the thermal conductive film is made of one of platinum and an alloy of platinum.

7. A flow sensor for detecting a flow velocity of fluid, comprising:

a substrate;

a heater for generating heat, being formed on the substrate, having a film structure and having a predetermined pattern, and;

a temperature detector for detecting temperature of the fluid, being formed on the substrate, having a film structure and having a predetermined pattern so that at least one portion of the temperature detector is enclosed in an inside of the pattern of the heater.

8. A flow sensor according to claim 7, wherein:

the substrate has a hollow portion and a thin film structure portion provided above the hollow portion;

the heater and the temperature detector are formed on the film structure portion;

the temperature detector includes a first detector and a second detector, each of the first and the second detectors has the predetermined pattern so that at least one portion thereof is enclosed inside of the pattern of the heater; and the flow velocity of the fluid is detected based on temperature difference between the temperature detected by the first detector and the temperature detected by the second detector.

9. A flow sensor according to claim 7, wherein:

the substrate has a hollow portion and a thin film structure portion provided above the hollow portion; and further comprising:
   a fluid thermometer formed on the substrate at a portion other than the thin film structure portion, for detecting temperature of the fluid, wherein
     the flow velocity of the fluid is detected based on temperature difference between the temperature detected by the temperature detector and the temperature detected by the fluid thermometer.

10. A flow sensor according to claim 7, wherein:

the predetermined pattern of the heater has plural returning portions; and the predetermined pattern of the temperature detector has plural returning portions having enclosed portions, which are enclosed in the inside of the returning portions of the heater.

11. A flow sensor according to claim 10, wherein the temperature detector further has plural extension portions, each of which has plural returning portions, at a portion other than the enclosed portions.

12. A flow sensor according to claim 11, wherein a length of each of the enclosed portions of the temperature detector is shorter than a half of a length of each of the returning portions of the heater.

13. A flow sensor according to claim 11, wherein the number of the returning portions per one extension portion of the temperature detector is larger than the number of the returning portions of the temperature detector enclosed in the inside of one returning portion of the heater.

14. A flow sensor according to claim 11, wherein the temperature detector has plural connecting portions having a length of $L_1$ between each enclosed portion, a total length $L_T$ of each of the extension portion is set to $L_1<L_T<6L_1$.

15. A flow sensor according to claim 1, wherein the thermal conductive film is made of the same material as the heater and the temperature detector.

16. A flow sensor according to claim 15, wherein the thermal conductive film is electrically isolated from both the heater and the temperature detector.

17. A flow sensor according to claim 1, wherein the thermal conductive film is made of the same material as the heater and the temperature detector.

18. A flow sensor according to claim 17, wherein the thermal conductive film is made of the same material as the heater and the temperature detector.

* * * * *